(12) United States Patent
Hirose et al.

(10) Patent No.: US 8,876,195 B2
(45) Date of Patent: Nov. 4, 2014

(54) SHOCK ABSORBER AND VEHICULAR DOOR TRIM INCLUDING THE SAME

(71) Applicant: Toyota Boshoku Kabushiki Kaisha, Aichi-ken (JP)

(72) Inventors: Fumitaka Hirose, Kariya (JP); Yoshiaki Maesoba, Kariya (JP); Isao Yamanaka, Yokosuka (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 109 days.

(21) Appl. No.: 13/692,181

(22) Filed: Dec. 3, 2012

(65) Prior Publication Data

US 2013/0147230 A1      Jun. 13, 2013

(30) Foreign Application Priority Data

Dec. 9, 2011  (JP) ................................ 2011-270334

(51) Int. Cl.
| | |
|---|---|
| *B60R 13/00* | (2006.01) |
| *F16F 7/12* | (2006.01) |
| *B60R 13/02* | (2006.01) |
| *B60R 21/04* | (2006.01) |

(52) U.S. Cl.
CPC ............ *F16F 7/121* (2013.01); *B60R 13/0243* (2013.01); *B60R 21/0428* (2013.01)
USPC .................................. 296/187.12; 296/146.6

(58) Field of Classification Search
USPC ............... 296/187.12, 187.02, 146.6, 187.05, 296/187.03, 187.04, 187.09, 187.11; 293/109, 102, 120
See application file for complete search history.

(56) References Cited

U.S. PATENT DOCUMENTS

| | | | | |
|---|---|---|---|---|
| 3,989,275 A | * | 11/1976 | Finch et al. | .................. 280/751 |
| 4,272,103 A | * | 6/1981 | Schmid et al. | ................ 280/751 |
| 2011/0233962 A1 | * | 9/2011 | Tada et al. | ............... 296/187.12 |

FOREIGN PATENT DOCUMENTS

JP      2008-174045      7/2008

* cited by examiner

*Primary Examiner* — Joseph D Pape
(74) *Attorney, Agent, or Firm* — Greenblum & Bernstein, P.L.C.

(57) ABSTRACT

A shock absorber includes a first shock absorbing member formed of a foam, and a second shock absorbing member formed of a foam and having hardness greater than the first shock absorbing member. The first shock absorbing member and the second shock absorbing member are arranged in adjacent to each other and connected to each other such that a part of one of the first shock absorbing member and the second shock absorbing member is surrounded by another one of the first shock absorbing member and the second shock absorbing member, thereby the first shock absorbing member and the second shock absorbing member are connected integrally with each other.

17 Claims, 7 Drawing Sheets

US 8,876,195 B2

SHOCK ABSORBER AND VEHICULAR DOOR TRIM INCLUDING THE SAME

CROSS REFERENCE TO RELATED APPLICATION

This application claims priority from Japanese Patent Application No. 2011-270334 filed on Dec. 9, 2011. The entire contents of the priority application are incorporated herein by reference.

FIELD OF THE INVENTION

The present disclosure relates to a shock absorber and a vehicular door trim including the same.

BACKGROUND OF THE INVENTION

A shock absorber (a shock absorbing pad) is mounted to amount base such as a vehicular door trim. If a passenger of a vehicle is contacted with the mount base in case of a collision, such a shock absorber is deformed (buckled) and absorbs the shock to be applied to the passenger in case of the collision. The shock may be applied to various parts of a passenger's body, and the shock absorber is required to have different shock absorbing properties for absorbing shock applied to each body part of the passenger. In such a case, shock absorbers each having a different shock absorbing property are mounted to a mount base corresponding to each body part of the passenger. Specifically, the shock absorbers each having a different hardness corresponding to each body part of the passenger are mounted to the mount base independently from each other.

In the above configuration, each one of the shock absorbers needs to be mounted to the mount base separately. This deteriorates mounting workability. To solve this problem, a shock absorber includes two shock absorbers each having a different hardness that are connected to each other to integrally form one component. With this configuration, the two shock absorbers can be collectively mounted to a door trim base at one time. In such a shock absorber integrally including the two shock absorbers each having a different hardness, the two shock absorbers are connected at adjacent (facing) surfaces thereof, and thus the connection force between the two shock absorbers is more likely to be weak at the connection surfaces. Thus, an improvement of the connection force between the two shock absorbers at the connection surfaces is required.

SUMMARY OF THE INVENTION

The present invention has been made in view of the aforementioned circumstances. An objective of the present invention is to provide a shock absorber including shock absorbing members each having a different hardness that are connected to each other and improving mounting workability and increasing connection force between adjacent shock absorbing members. Another objective of the present invention is to provide a vehicular door trim including such a shock absorber.

A technology described herein relates to a shock absorber including a first shock absorbing member formed of a foam and a second shock absorbing member formed of a foam and having hardness greater than the first shock absorbing member. The first shock absorbing member and the second shock absorbing member are arranged in adjacent to each other and connected to each other such that a part of one of the first shock absorbing member and the second shock absorbing member is surrounded by another one of the first shock absorbing member and the second shock absorbing member, thereby the first shock absorbing member and the second shock absorbing member are connected integrally with each other.

DETAILED DESCRIPTION OF THE PREFERRED EMBODIMENTS

One embodiment will be explained with reference to FIGS. 1 to 6. A door trim 10 (a vehicular door trim) is mounted on a compartment inner side of a door inner panel (not illustrated) that configures a vehicular door.

Figure 1:
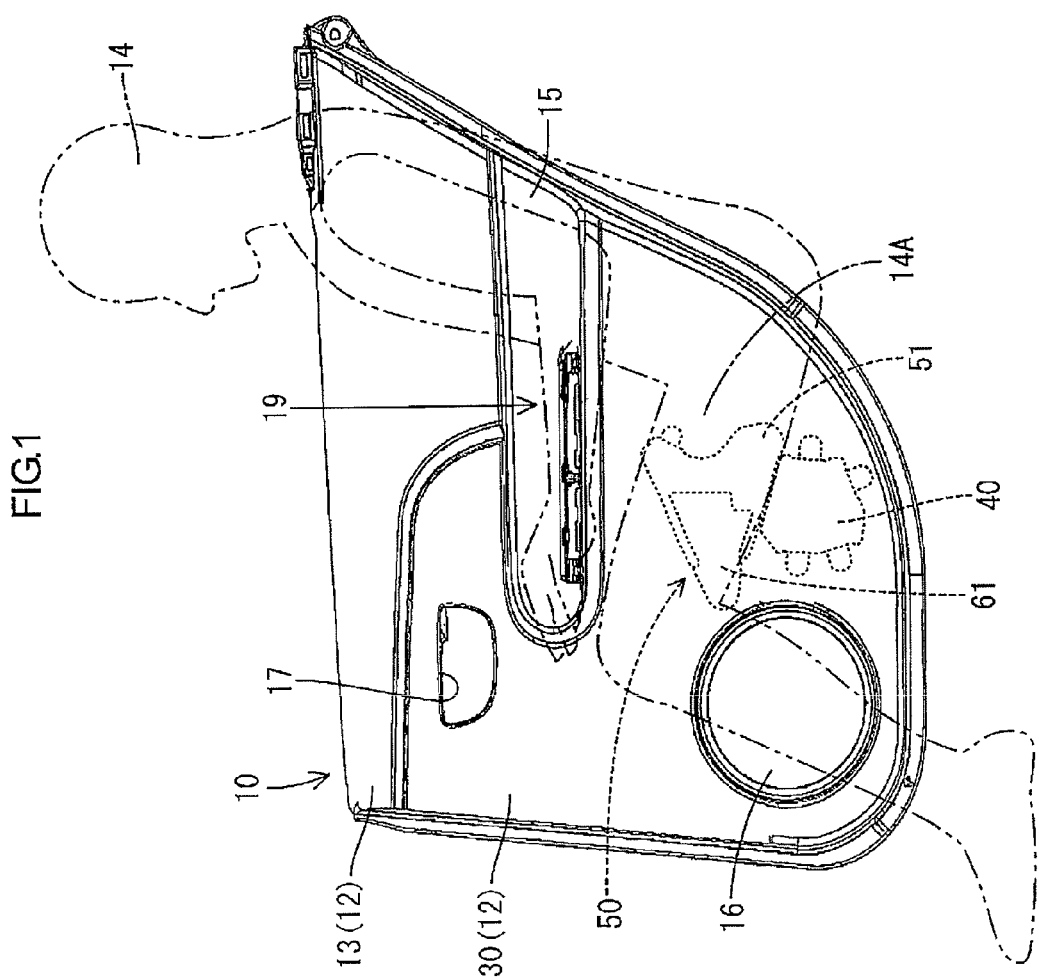
FIG. 1 is a front view of a door trim according to a first embodiment.

As illustrated in FIG. 1, the door trim 10 primarily includes a trim board 12 and an ornament 15 attached to the trim board 10. The trim board 12 is formed of a synthetic resin such as polypropylene. The trim board 12 may be formed of other materials than the synthetic resin, for example, a material mixing a wood-based material and a synthetic resin. The trim board 12 includes an upper board 13 that configures an upper portion of the trim board, and a lower board 30 that configures a lower portion of the trim board 12. A skin (not illustrated) is adhered to cover a surface of the trim board 12.

On the lower board 30, a speaker grill 16 and an inside handle housing member 17 are provided. The ornament 15 is provided between the upper board 13 and the lower board 30. The door trim 10 further includes an armrest 19 projected toward the inner side of the vehicle compartment.

Figure 4:
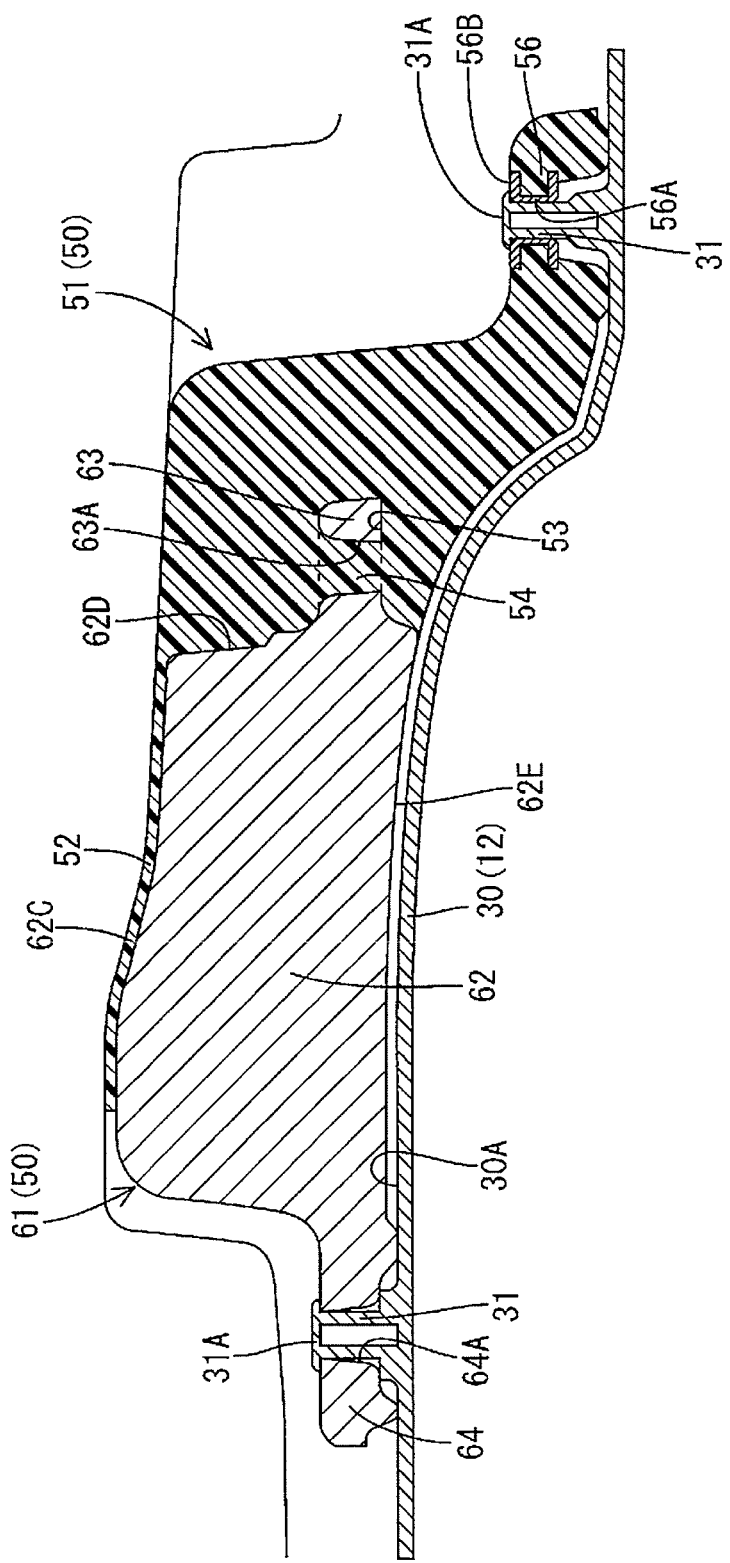
FIG. 4 is a cross-sectional view of the shock absorber taken along a line A-A in FIG. 2.
Figure 5:
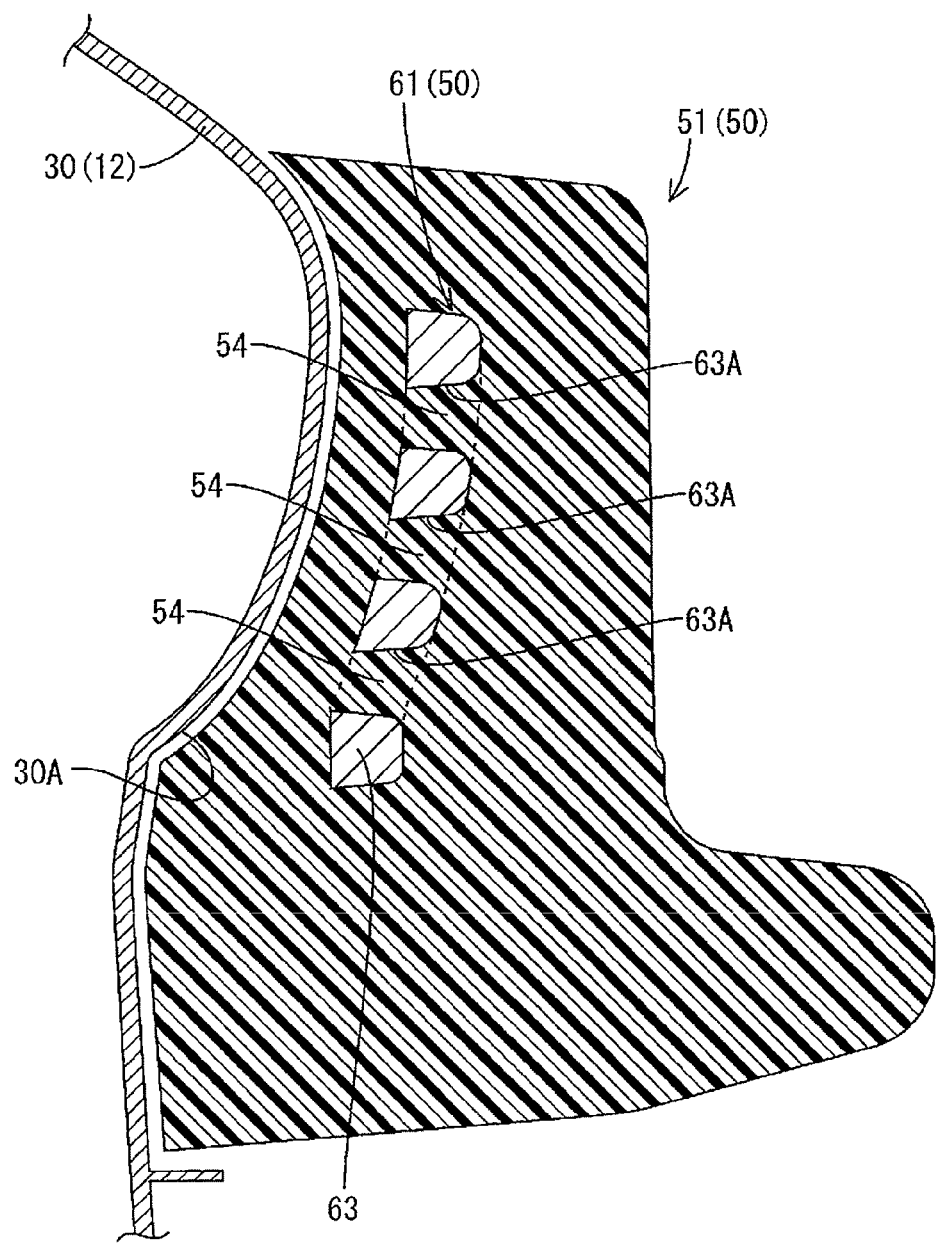
FIG. 5 is a cross-sectional view of the shock absorber taken along a line B-B in FIG. 2.

As illustrated in FIGS. 1 and 4, a shock absorber 50 is mounted to an exterior surface 30A of the lower board 30 that faces the outside of the vehicle compartment. As illustrated in FIG. 1, a spacer 40 is located directly below the shock absorber 50 on the exterior surface 30A of the lower board 30. The shock absorber 50 and the spacer 40 are mounted in a space between the door inner panel and the lower board 30. In FIG. 1, the shock absorber 50 and the spacer 40 are indicated by a broken line.

The spacer 40 is formed of a synthetic resin. The spacer 40 includes a plurality of reinforcing ribs (not illustrated) and has high rigidity, for example. The spacer 40 is provided to face a seat (not illustrated) arranged in the vehicle compartment. If the spacer 40 is displaced toward the inside of the vehicle compartment in case of a side collision, the spacer 40 comes in contact with the lower board 30 and presses the seat from the outside of the vehicle compartment.

In this configuration, the spacer transmits a load applied in case of the side collision to the seat, and the displacement of the trim board 12 toward the inside of the vehicle compartment is less likely to occur. This protects the passenger in the vehicle. Further, the seat includes a high rigidity member such as a pipe member (not illustrated) in its inside. Thus, the seat can withstand the load caused by the side collision.

As illustrated in FIG. 1, the shock absorber 50 is arranged on the lower board 30 so as to correspond to a thigh of the passenger 14. The shock absorber 50 is mounted for energy absorption (EA) that is required in case of the side collision (side collision against the vehicular door), and it may be called as an EA member.

Figure 2:
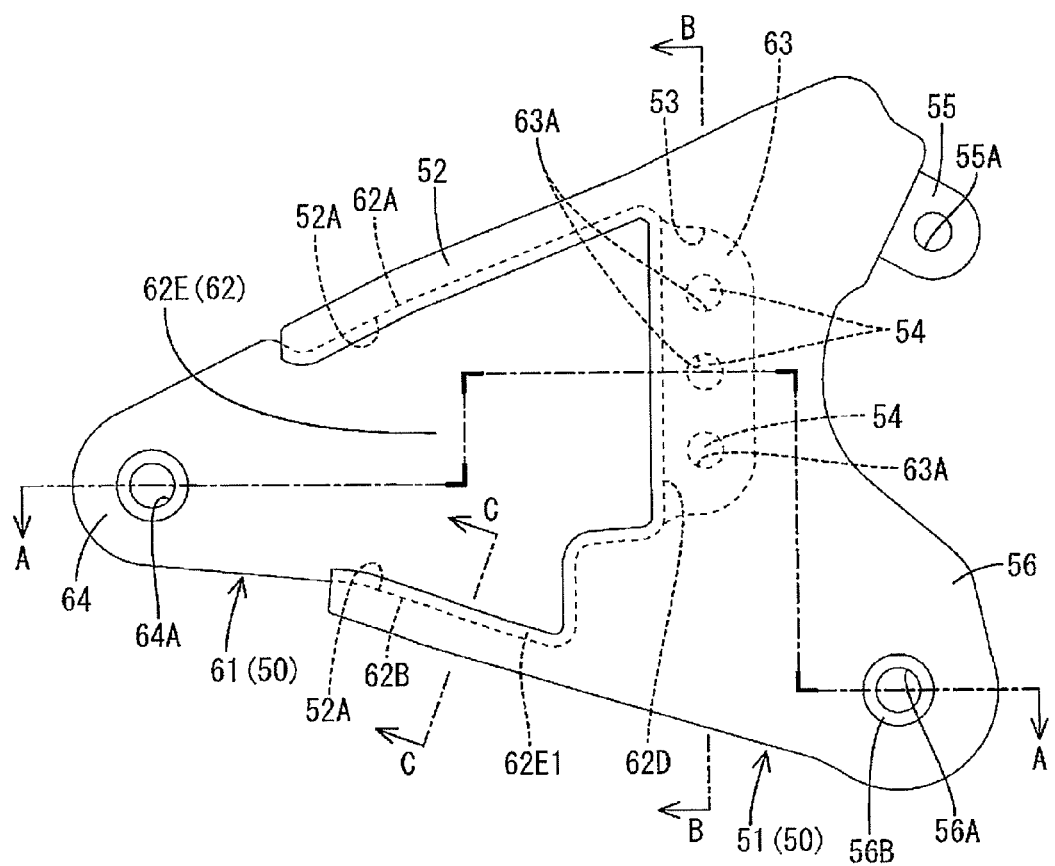
FIG. 2 is a front view of a shock absorber viewed from an inside of a vehicle compartment.
Figure 3:
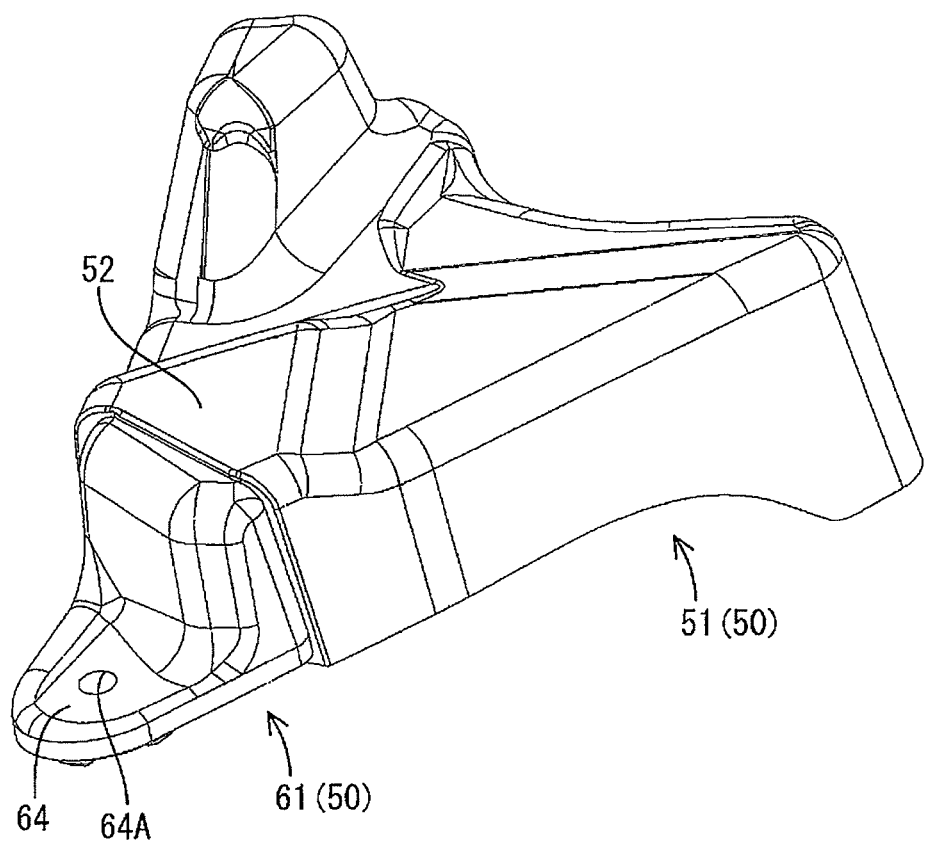
FIG. 3 is a perspective view of the shock absorber viewed from an outside of the vehicle compartment.

The shock absorber 50 has a substantially triangular shape in a plan view as illustrated in FIGS. 2 and 3 and has a thickness in a width direction of the vehicle. The shock absorber 50 includes two separate shock absorbing members each having a different hardness. Specifically, a first shock absorbing member 51 mounted on a vehicle rear side (a right side in FIG. 2) and a second shock absorbing member 61 mounted on a vehicle front side of the first shock absorbing member 51 (a left side in FIG. 2) are connected to integrally configure the shock absorber 50. As illustrated in FIG. 4, the first shock absorbing member 51 and the second shock absorbing member 61 are adjacent to each other on the lower board 30 (a mount base to which the shock absorber is mounted).

The first shock absorbing member 51 is configured with a urethane foam, for example. The second shock absorbing member 61 is configured with a PP bead foam, for example. The second shock absorbing member 61 has a hardness greater than the first shock absorbing member 51. As illustrated in FIG. 1, the first shock absorbing member 51 is arranged to correspond to a part of the thigh 14A of the passenger 14 close to the vehicle front side and the second shock absorbing member 61 is arranged to correspond to a part of the thigh 14A of the passenger 14 close to the vehicle rear side (close to a hip of the passenger).

As illustrated in FIG. 2, the first shock absorbing member 51 includes a connection portion 52, mounting portions 55, 56, and a body portion between the connection portion 52 and the mounting portions 55, 56. The connection portion 52 is located on the vehicular front side of the first shock absorbing member 51. The second shock absorbing member 61 includes a main body portion 62 and a mounting portion 64. The main body portion 62 is located on the vehicular rear side of the second shock absorbing member 61. The second shock absorbing member 61 is formed in substantially a triangular prism shape having two base surfaces and three side surfaces. The two base surfaces include a compartment exterior surface 62C facing the compartment outer side and an interior surface 62E facing the compartment inner side. The three side surfaces include an upper surface 62A, a lower surface 62B and a vehicular rear surface 62D.

As illustrated in FIG. 2, a peripheral portion of the main body portion 62 of the second shock absorbing member 61 (a part of one shock absorbing member) is surrounded by the connection portion 52 of the first shock absorbing member 51 (a part of the other one of the shock absorbing member). In other words, the connection portion 52 of the first shock absorbing member 51 is configured to surround the peripheral portion of the main body portion 62 of the second shock absorbing member 61. Accordingly, an outer surface of the main body portion 62 of the second shock absorbing member 61 is connected to an inner surface of the connection portion 52 of the first shock absorbing member 51 such that the first shock absorbing member 51 and the second shock absorbing member 61 are integrally provided as the shock absorber 50 having substantially a prism shape, specifically having substantially a triangular prism shape as illustrated in FIGS. 2 and 3.

The shock absorber 50 configured with the first shock absorbing member 51 and the second shock absorbing member 61 is formed by insert molding in which the main body portion 62 of the second shock absorbing member 61 configures an insertion member. A molding die (not illustrated) for molding the shock absorber 50 has a molding space for molding the first shock absorbing member 51. First, a material for the main body portion 62 of the second shock absorbing member 61 is inserted in the molding space of the molding die to mold the main body portion 62. Then, the molding space is filled with urethane to mold the first shock absorbing member 51 and the urethane is subjected to foaming. As a result, the first shock absorbing member 51 is molded in a manner as to cover the peripheral portion of the main body portion 62 of the second shock absorbing member 61.

As illustrated in FIGS. 2 and 4, the connection portion 52 of the first shock absorbing member 51 is provided to cover the upper surface 62A of the main body portion 62 of the second shock absorbing member 61, the lower surface 62B (see FIG. 6), the compartment exterior surface 62C (an upper surface in FIG. 4), and the vehicular rear surface 62D. The connection portion 52 of the first shock absorbing member 52 is connected to the upper surface 62A, the lower surface 62B, the exterior surface 62C, and the rear surface 62D. Specifically, the upper surface 62A is connected to an inner surface 52A of the connection portion 52 facing the upper surface 62A, and the lower surface 62B is connected to the inner surface 52A of the connection portion 52 facing the lower surface 62B, and the vehicular rear surface 62D is connected to the inner surface 52A of the connection portion 52 facing the rear surface 62D. Thus, the facing surfaces of the first shock absorbing member 51 and the second shock absorbing member 61 face each other and are connected to integrally form the shock absorber 51. The facing surfaces are connecting surfaces.

Figure 6:
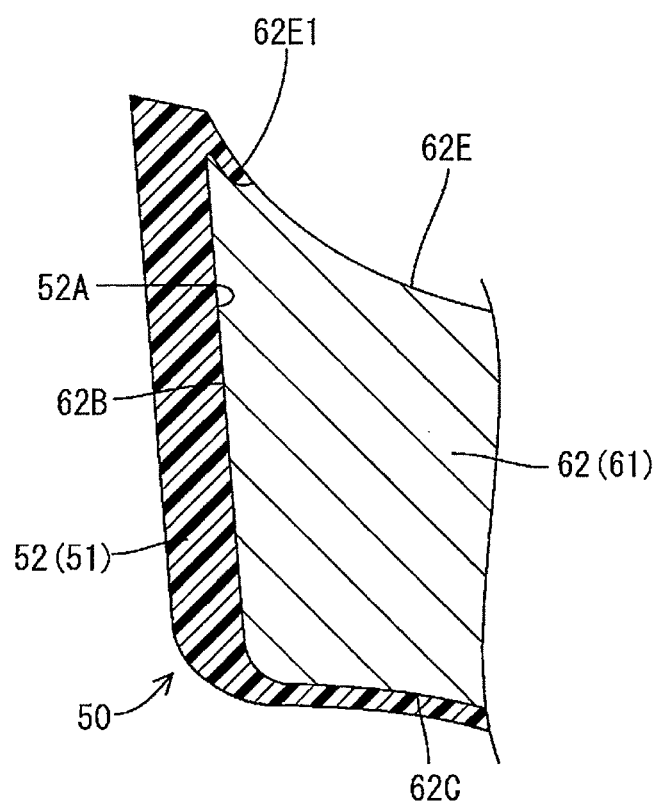
FIG. 6 is cross-sectional view of the shock absorber taken along a line C-C in FIG. 2.

As illustrated in FIGS. 2 and 6, the first shock absorbing member 51 covers a peripheral portion 62E1 of a compartment interior surface 62E of the main body portion 62 facing the compartment inner side. The compartment interior surface 62E except for the peripheral portion 62E1 is an exposed surface that is not covered with the first shock absorbing member 51. The compartment interior surface 62E faces the compartment outer side surface 30A of the lower board 30. The first shock absorbing member 51 may cover any other part of the compartment interior surface 62E in addition to or other than the peripheral portion 62E1 as long as at least a part of the compartment interior surface 62E of the main body portion 62 is exposed. Thus, in the present embodiment, the first shock absorbing member 51 and the second shock absorbing member 61 are connected to each other such that the peripheral portion of the second shock absorbing member 51 sandwich the peripheral portion 62E1 of the first shock absorbing member 61. Specifically, the portion of the compartment interior surface 62E and the portion of the compartment exterior surface 62 are also connected to the inner surface of the connection portion 52 and correspond to the connecting surfaces.

In the configuration that the main body portion 62 of the second shock absorbing member 61 is surrounded by the connection portion 52 of the first shock absorbing member 51, at least two surfaces of the main body portion 62 are covered with the connection portion 52. The main body portion 62 of the second shock absorbing member 61 in this embodiment corresponds to a portion surrounded by the first shock absorbing member 51. The connection portion 52 of the first shock absorbing member 51 corresponds to a portion surrounding the main body portion 62 of the second shock absorbing member 61. In FIG. 2, an outer periphery of the main body portion 62 of the second shock absorbing member 61 is indicated by a broken line.

As illustrated in FIGS. 2 and 4, an extended portion 63 extends from the rear surface 62D of the main body portion 62 of the second shock absorbing member 61 toward the vehicle rear side. In FIG. 2, the extended portion 63 is indicated by a broken line. The extended portion 63 is fitted into a recess 53 formed in the surface of the connection portion 52 that faces the second shock absorbing member 61. Through holes 63A (extended portion fitting portions) are formed in the extended portion 63 so as to extend in a vehicle width direction (a direction perpendicular to a protruding direction of the extended portion 63, an upper-and-lower direction in FIG. 4).

The through holes 63A each has a circular shape. As illustrated in FIG. 2, inserting portions 54 (recess fitting portions) provided on an inner surface of the recess 53 of the first shock absorbing member 51 pass through (are fitted to) the through holes 63A, respectively. The inserting portions 54 each have a cylindrical shape that can be fitted into the through hole 63A. As illustrated in FIG. 4, each end of the inserting portion 54 is connected to surfaces of the recess 53 that face each other.

As described above, each inserting portion 54 is passed through each through hole 63A (the extended portion fitting portion and the recess fitting portion are fitted to each other), and thus the extended portion 63 does not drop off from the recess 53. The inserting portions 54 and the through holes 63A are arranged (three inserting portions 54 and three through holes 63A in the present embodiment) in the vertical direction in FIGS. 2 and 5. In the above insert molding, the through holes 63A are filled with urethane for molding the first shock absorbing member 51, thereby molding the inserting portion 54.

As illustrated in FIG. 2, the main body portion 62 of the second shock absorbing member 61 increases in a width dimension in the upper-and-lower direction as is closer to the rear side of the vehicle (the first shock absorbing member 51). The connection portion 52 of the first shock absorbing member 51 is formed in a shape that can cover the outer peripheral portion of the main body portion 62.

With this configuration, the upper surface 62A and the lower surface 62B of the main body portion 62 of the second shock absorbing member 61 are held by the inner surface 52A of the connection portion 52 of the first shock absorbing member 51 from the portion of the second shock absorbing member 61 having a greater width. Accordingly, the first shock absorbing member 51 is less likely to be displaced or deformed toward the vehicle front side (the left side in FIG. 2) or toward the portion of the second shock absorbing member having a smaller width. This enhances the connection between the first shock absorbing member 51 and the second shock absorbing member 61.

Next, a mounting structure of the shock absorber 50 to the lower board 30 will be explained. As illustrated in FIG. 4, mounting bosses 31 (three bosses 31 in the present embodiment) protrude from the exterior surface 30A of the lower board 30. The shock absorber 50 according to the present embodiment is mounted to the lower board 30 by the mounting bosses 31. As illustrated in FIG. 2, three mounting portions 55, 56, 64 are provided at the peripheral edge portions of the shock absorber 50 (near corner portions). The mounting portions 55, 56, 64 each have a thickness smaller than portions other than the mounting portions 55, 56, 64 of the shock absorber 50 (see FIG. 3).

Each mounting portion 55, 56, 64 includes an insertion hole 55A, 56A, 64A extending in the thickness direction thereof. The mounting bosses 31 are passed through the corresponding insertion hole 55A, 56A, 64A. A tip end portion 31A of each mounting boss 31 passed through the insertion holes 55A, 56A, 64A is welded (thermally caulked) by an ultrasonic welding, for example.

This enables the tip end portion 31A of each mounting boss 31 to be held at the edge of each insertion hole 55A, 56A, 64A, and thus the mounting portions 55, 56, 64 are attached to the lower board 30. In the present embodiment, the first shock absorbing member 51 includes the mounting portions 55, 56 (the first mounting portion) and the second shock absorbing member 61 includes the mounting portion 64 (the second mounting portion). That is, the first shock absorbing member 51 and the second shock absorbing member 61 are separately mounted to the lower board 30 (the mount base to which the shock absorber is mounted).

As illustrated in FIG. 4, a washer 56B is provided to the insertion hole 56A of the mounting portion 56. The mounting portion 56 is attached to the mounting boss 31 via the washer 56B. The washer 56B improves the attachment strength of the mounting portion 56 to the lower board 30. However, the washer 56B may not be provided.

The mounting portion 64 is provided on an end portion of the second shock absorbing member 61 close to the front side in the front-and-rear direction of the vehicle. That is, the second shock absorbing member 61 is mounted to the lower board 30 at a portion other than the main body portion 62 of the second shock absorbing member 61 (a portion other than the connection area of the other one of the shock absorbing members).

Next, advantageous effects of the present embodiment will be explained. The shock absorber 50 according to the present embodiment includes the first shock absorbing member 51 and the second shock absorbing member 61 each formed of a foam. The second shock absorbing member 61 has a hardness higher than that of the first shock absorbing member 51. The first shock absorbing member 51 and the second shock absorbing member 61 are provided in adjacent to each other on the lower board 30 to which the shock absorber 50 is mounted. The main body portion 62 of the second shock absorbing member 61 is covered with and surrounded by the connection portion 52 of the first shock absorbing member 51 such that the main body portion 62 of the second shock absorbing member and the connection portion 52 of the first shock absorbing member 51 are adjoined to be one component.

In the present embodiment, the first shock absorbing member 51 and the second shock absorbing member 61 each having a different hardness are adjoined to be one component. This facilitates the mounting workability compared with the case that the shock absorbers each having a different hardness are individually mounted to the lower board 30 (the mount base). Further, the peripheral portion of the main body portion 62 of the second shock absorbing member 61 is covered with the connection portion 52 of the first shock absorbing member 51. With this configuration, a large connection area between the first shock absorbing member 51 and the second shock absorbing member 61 can be obtained, and thus the connection between the first and the second shock absorbing members 51, 61 is improved. Thus, if a load is applied to the shock absorber 50, the first and the second shock absorbing members 51, 61 adjacent to each other on the lower board 30 are less likely to be separated at the connected portion.

The first and the second shock absorbing members 51, 61 are molded by the insert molding in which the main body portion 62 of the second shock absorbing member 61 is used as an inserted member. As a result, a peripheral portion of the main body portion 62 of the second shock absorbing member 61 is covered with and surrounded by the connection portion 52 of the first shock absorbing member 51.

Further, by the insert molding, the peripheral portion of the main body portion 62 of the second shock absorbing member 61 can be easily covered with and surrounded by the connection portion 52 of the first shock absorbing member 52. In addition, the connection between the first and second shock absorbing members can be improved.

The extended portion 63 extends from the main body portion 62 of the second shock absorbing member 61 and fits into the recess 53 of the connection portion 52 of the first shock absorbing member 51. The extended portion 63 includes the through holes 63A through which the inserting portions 54 provided on the inner surface of the recess 53 pass. Each of the inserting portions 54 passes through the corresponding through hole 63A such that the extended portion 63 is held in the recess 53.

The extended portion 63 is fitted into the recess 53 and held in the recess 53, and thus the connection between the first shock absorbing member 51 and the second shock absorbing member 61 can be further improved.

In the present embodiment, the shock absorber 50 is formed by the insert molding. In the insert molding, the through holes 63A are filled with urethane to form the inserting portions 54. Thus, the inserting portions 54 each of which is inserted in the corresponding through hole 63A can be easily molded.

The first shock absorbing member 51 includes the mounting portions 55, 56 attached to the lower board 30 and the second shock absorbing member 61 includes the mounting portion 64 attached to the lower board 30.

The mounting portions 55, 56 and the mounting portion 64 enable the first shock absorbing member 51 and the second shock absorbing member 61 to be attached to the lower board 30 to mount the shock absorber 50 thereon. With this configuration, the shock absorber 50 can be more securely attached to the lower board 30 compared with a case in which the shock absorber 50 is mounted on the lower board 30 via only one of the first shock absorbing member 51 and the second shock absorbing member 61.

The second shock absorbing member 61 is attached to the lower board 30 at a portion other than the main body portion 62 of the second shock absorbing member 61.

The second shock absorbing member 61 having a relatively high hardness is attached to the lower board 30, and thus, the shock absorber 50 can be more securely attached to the lower board 30.

In the present embodiment, the door trim 10 includes the shock absorber 50 and the trim board 12 (the lower board 30) that has the exterior surface 30A on which the shock absorber 50 is mounted. At least a part of the interior surface 62E (a surface facing the exterior surface 30A) of the main body portion 62 of the second shock absorbing member 61 is an exposed surface that is not covered with the first shock absorbing member 51.

As illustrated in FIG. 4, the interior surface of the shock absorber 50 (the surface facing the exterior surface 30A of the lower board 30) faces toward the passenger 14 of vehicle. In the present embodiment, the main body portion 62 of the second shock absorbing member 61 is surrounded by the connection portion 52 of the first shock absorbing member 51. If the entire area of the interior surface 62E (the surface facing the passenger 14) of the main body portion 62 of the second shock absorbing member 61 is covered with the first shock absorbing member 51, the main body portion 62 of the second shock absorbing member 61 is brought into contact with the passenger 14 via the first shock absorbing member 51. This does not allow the second shock absorbing member 61 to exhibit its shock absorbing properties.

In the present embodiment, a part (except for the peripheral portion) of the interior surface 62E of the main body portion 62 of the second shock absorbing member 61 is the exposed surface that is not covered with the first shock absorbing member 51. Accordingly, the first shock absorbing member 51 is less likely to be provided between the main body portion 62 of the second shock absorbing member 61 and the passenger 14. Thus, the second shock absorbing member 61 can exhibit its shock absorbing properties.

The peripheral portion 62E1 of the interior surface 62E of the main body portion 62 is covered with the first shock absorbing member 51. With this configuration, the second shock absorbing member 61 is less likely to displace toward the inner side of the compartment of the vehicle. This improves the connection between the second shock absorbing member 61 and the first shock absorbing member 51.

The shock absorber 50 is arranged on the lower board 30 at a position corresponding to the thigh 14A of the passenger 14. The first shock absorbing member 51 and the second shock absorbing member 61 are arranged adjacent to each other such that the first shock absorbing member 51 is on the rear side of the second shock absorbing member 61 and the second shock absorbing member 61 is on the front side of the first shock absorbing member 51 in the front-to-rear direction of the vehicle.

In the shock absorber 50 arranged to correspond to the thigh 14A of the passenger 14, the first shock absorbing member 51 having a relatively low hardness is arranged on the rear side of the vehicle. Thus, in case of a side collision, a portion around the hip (acetabulum and ilium, for example) of the passenger 14 that is located on the rear side of the thigh 14A can be properly protected. Further, the second shock absorbing member 61 having a relatively high hardness is arranged on the front side of the vehicle. Thus, in case of a side collision, the second shock absorbing member 61 having a relatively high hardness can properly push the thigh 14A of the passenger 14 toward the inside of the compartment of the vehicle. This properly protects the passenger 14 in case of a side collision.

Other Embodiments

The present invention is not limited to the embodiments as described above with reference to the drawings. For example, the present invention may include following embodiments.

(1) In the above embodiment, the shock absorber 50 includes the first shock absorbing member 51 and the second shock absorbing member 61. However, the present invention is not limited thereto. The shock absorber only has to include at least two shock absorbing members each having a different hardness. The shock absorber may include three or more shock absorbing members each having a different hardness.

(2) The material of each of the first shock absorbing member 51 and the second shock absorbing member 61 is not limited to those exemplified above. The material can be properly changed as long as the second shock absorbing member 61 has the hardness higher than that of the first shock absorbing member 51. The hardness of the first shock absorbing member and the second shock absorbing member 61 may be differentiated by changing the foaming ratio thereof.

(3) The shape of each of the first shock absorbing member 51 and the second shock absorbing member 61 is not limited to that illustrated in the above embodiments and may be properly changed. In the above embodiments, the first shock absorbing member 51 and the second shock absorbing member 61 are arranged in the front-and-rear direction of the vehicle. However, the present invention is not limited thereto. For example, the first shock absorbing member 51 and the second shock absorbing member 61 may be arranged in an upper-and-lower direction of the vehicle. Namely, the arrangement of the first shock absorbing member 51 and the second shock absorbing member 61 may be properly changed so as to correspond to any parts of the body of the passenger.

(4) In the above embodiment, the shock absorber 50 mounted on the trim board 12 is illustrated. However, the shock absorber 50 may be mounted on a member other than the trim board 12.

(5) A part of the first shock absorbing member 51 may be surrounded by a part of the second shock absorbing member 61.

(6) The number and positions of mounting portions 55, 56, 64 are not limited to those illustrated in the above embodiment and may be properly changed. The mounting portion may be provided on only one of the first shock absorbing member 51 and the second shock absorbing member 61. In a case that the mounting portion is only provided on one of the first shock absorbing member 51 and the second shock absorbing member 61, the shock absorber 50 can be more securely mounted to the lower board 30 by providing the mounting portion on the second shock absorbing member 61 that has a higher hardness than the first shock absorbing member 51.

Figure 7:
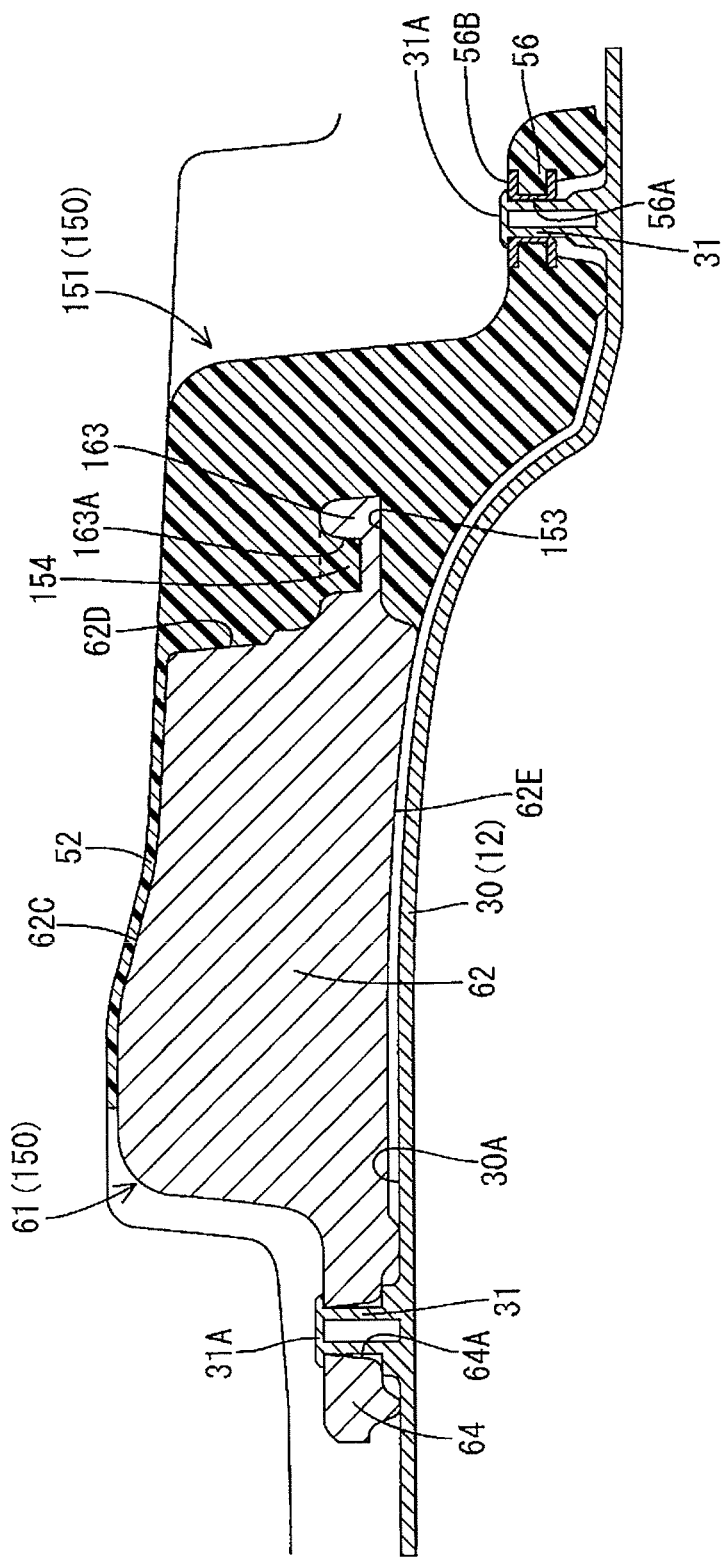
FIG. 7 is a cross-sectional view of a shock absorber according to another embodiment.

(7) In the above embodiments, the insertion holes 54 and the through holes 63A are illustrated as the first and second fitting portions. However, the present invention is not limited thereto. For example, as illustrated in FIG. 7, a shock absorber 150 may include a concave portion 163A (the second fitting portion) in an extended portion 163 and a convex portion 154 (the first fitting portion) on an inner surface of a recess 153. The convex portion 154 fits into the concave portion 163A, and thus the extended portion 163 is held to the recess 153. Accordingly, the extended portion 163 does not drop off from the recess 153. The formation position of the concave portion 163A and the convex portion 154 may be opposite. That is, the concave portion 163A may be provided on the inner surface of the recess 153 and the convex portion 154 may be formed in the extended portion 163.

The embodiments of the present invention have been described, however, the present invention is not limited to the above embodiments explained in the above description and the drawings. The technology described herein includes various modifications of the above embodiments.

Elements of technology described in this specification or illustrated in the drawings exert technical utility by each or a combination thereof. The elements of technology should not be limited to the combinations of the elements claimed in the original patent application. The technology described in this specification or illustrated in the drawings is provided for achieving multiple objectives at the same time. The technical utility of the technology is exerted when at least one of the objectives is achieved.

The invention claimed is:

1. A shock absorber comprising:
a first shock absorbing member formed of a foam; and
a second shock absorbing member formed of a foam and having hardness greater than the first shock absorbing member, wherein
the first shock absorbing member and the second shock absorbing member are arranged adjacent to each other and connected to each other such that a part of one of the first shock absorbing member and the second shock absorbing member is surrounded by another one of the first shock absorbing member and the second shock absorbing member, thereby the first shock absorbing member and the second shock absorbing member are connected integrally with each other,
the shock absorber is mounted to a vehicular part,
each of the first shock absorbing member and the second shock absorbing member has a facing surface, and the facing surfaces face each other,
each of the facing surface of the first shock absorbing member and the facing surface of the second shock absorbing member extend in a vehicular interior-to-exterior direction, and
one of the first shock absorbing member and the second shock absorbing member includes a fitting portion on its facing surface, and the other one of the first shock absorbing member and the second shock absorbing member includes a receiving portion on its facing surface, and the fitting portion and the receiving portion are fitted to each other.

2. The shock absorber according to claim 1, wherein
each of the first shock absorbing member and the second shock absorbing member has at least two facing surfaces and the at least two facing surfaces of the first shock absorbing member face are connected to the at least two facing surfaces of the second shock absorbing member, and the at least two facing surfaces are connecting surfaces, respectively, and
the part of the one of the first shock absorbing member and the second shock absorbing member that is surrounded by the other one corresponds to the connecting surfaces.

3. The shock absorber according to claim 2, wherein
the shock absorber is mounted to a mount base of a vehicular part,
the one of the first shock absorbing member and the second shock absorbing member has an interior surface located close to the mount base and an exterior surface located away from the mount base and has the at least two facing surfaces between the interior surface and the exterior surface, and
the connecting surfaces of the one of the first shock absorbing member and the second shock absorbing member that are surrounded by the other one includes a part of the interior surface and the exterior surface.

4. The shock absorber according to claim 3, wherein the connecting surfaces including the facing surfaces, the interior surface, and the exterior surface that are surrounded by the other one correspond to a peripheral edge of the one of the first shock absorbing member and the second shock absorbing member.

5. The shock absorber according to claim 4, wherein the connecting surfaces on the exterior surface extend over substantially an entire area of the exterior surface.

6. The shock absorber according to claim 5, wherein the interior surface is exposed and the connecting surfaces are not provided over an entire area of the interior surface.

7. The shock absorber according to claim 1, wherein
the fitting portion is an extended portion extending from the facing surface, and the extended portion has an extended portion fitting portion,
the receiving portion is a recess in the facing surface for receiving the extended portion, and the recess has a recess fitting portion, and
the extended portion fitting portion is fitted to the recess fitting portion.

8. The shock absorber according to claim 7, wherein the extended portion fitting portion is a through hole and the recess fitting portion is a projection.

9. A shock absorber comprising:

a first shock absorbing member formed of a foam; and a second shock absorbing member formed of a foam and having hardness greater than the first shock absorbing member, wherein the first shock absorbing member and the second shock absorbing member are arranged adjacent to each other and connected to each other such that a part of one of the first shock absorbing member and the second shock absorbing member is surrounded by another one of the first shock absorbing member and the second shock absorbing member, thereby the first shock absorbing member and the second shock absorbing member are connected integrally with each other, the shock absorber is mounted to a mount base of a vehicular part, the first shock absorbing member includes a first mounting portion that is mounted to the mount base, and the second shock absorbing member includes a second mounting portion that is mounted to the mount base.

10. The shock absorber according to claim 9, wherein the other one of the first shock absorbing member and the second shock absorbing member includes at least two first mounting portions or at least two second mounting portions.

11. The shock absorber according to claim 9, wherein the mount base includes mounting bosses, the first mounting portion includes a mounting hole in which one of the mounting bosses is inserted, whereby the first shock absorbing member is attached to the mount base, and the second mounting portion includes a mounting hole in which another one of the mounting bosses is inserted, whereby the second shock absorbing member is attached to the mount base.

12. The shock absorber according to claim 1, wherein each of the first shock absorbing member and the second shock absorbing member has at least three facing surfaces and the at least three facing surfaces of the first shock absorbing member face are connected to the at least three facing surfaces of the second shock absorbing member, and the at least three facing surfaces are connecting surfaces, respectively, and the part of the one of the first shock absorbing member and the second shock absorbing member that is surrounded by the other one corresponds to the connecting surfaces.

13. The shock absorber according to claim 3, wherein the first shock absorbing member and the second shock absorbing member are connected integrally with each other via the connecting surfaces to form substantially a prism shape.

14. A shock absorber comprising:

a first shock absorbing member formed of a foam; and a second shock absorbing member formed of a foam and having hardness greater than the first shock absorbing member, wherein the first shock absorbing member and the second shock absorbing member are arranged adjacent to each other and connected to each other such that a part of one of the first shock absorbing member and the second shock absorbing member is surrounded by another one of the first shock absorbing member and the second shock absorbing member, thereby the first shock absorbing member and the second shock absorbing member are connected integrally with each other, the shock absorber is mounted to a mount base of a vehicular part, the one of the first shock absorbing member and the second shock absorbing member is the second shock absorbing member, the other one of the first shock absorbing member and the second shock absorbing member is the first shock absorbing member, and the second shock absorbing member is attached to the mount base at a portion other than the part thereof surrounded by the first shock absorbing member.

15. A door trim of a vehicle comprising:

the shock absorber according to claim 1; and a trim board having a surface facing a compartment outer side, the trim board provided with the shock absorber on the surface, wherein the one of the first shock absorbing member and the second shock absorbing member is the second shock absorbing member, the other one of the first shock absorbing member and the second shock absorbing member is the first shock absorbing member, and the second shock absorbing member has an interior surface facing the surface of the trim board facing the compartment outer side and a part of the interior surface of the second shock absorbing member is not surrounded by the first shock absorbing member and is an exposed surface.

16. The door trim of a vehicle according to claim 15, wherein the shock absorber is mounted on the mount base at a position corresponding to a thigh of a passenger, and the first shock absorbing member is arranged on a rear side of the second shock absorbing member in a front-rear direction of the vehicle.

17. The shock absorber according to claim 1, wherein the other one of the first shock absorbing member and the second shock absorbing member includes a body portion and a connection portion that extends from the body portion such that the one of the first shock absorbing member and the second shock absorbing member is surrounded.

* * * * *